United States Patent [19]
VanDeMoere et al.

[11] Patent Number: 5,600,391
[45] Date of Patent: Feb. 4, 1997

[54] ONE PIECE VIEWFINDER AND FABRICATION PROCESS

[75] Inventors: Alan V. VanDeMoere; Ralph M. Lyon; Edward N. Balling, all of Rochester, N.Y.

[73] Assignee: Eastman Kodak Company, Rochester, N.Y.

[21] Appl. No.: 330,572

[22] Filed: Oct. 28, 1994

Related U.S. Application Data

[63] Continuation-in-part of Ser. No. 292,029, Aug. 14, 1994, abandoned, which is a continuation of Ser. No. 945,186, Sep. 15, 1992, Pat. No. 5,353,165.

[51] Int. Cl.⁶ .............................. G03B 13/02; G03B 17/02
[52] U.S. Cl. ................................................. 396/6; 396/373
[58] Field of Search ..................................... 354/219, 266, 354/288

[56] References Cited

U.S. PATENT DOCUMENTS

| | | | |
|---|---|---|---|
| 2,933,027 | 4/1960 | Hollingsworth et al. | 95/31 |
| 3,523,738 | 8/1970 | Chisholm | 359/362 |
| 3,731,586 | 5/1973 | Meazza | 88/1.5 R |
| 4,715,804 | 12/1987 | Takahashi | 264/328.11 |
| 4,812,863 | 3/1989 | Ohmura et al. | 354/219 |
| 4,812,866 | 3/1989 | Ushiro et al. | 354/288 |
| 4,855,774 | 8/1989 | Ohmura et al. | 354/203 |
| 4,882,600 | 11/1989 | VanDeMoere | 354/64 |
| 4,884,087 | 11/1989 | Mochida et al. | 354/75 |
| 4,890,130 | 12/1989 | Takei et al. | 354/288 |
| 4,913,718 | 4/1990 | Yoshimura et al. | 65/104 |
| 4,921,205 | 5/1990 | Drew, Jr. et al. | 249/61 |
| 4,932,764 | 6/1990 | Simpson, Jr. | 350/441 |
| 4,973,998 | 11/1990 | Gates | 354/288 X |
| 5,021,811 | 6/1991 | Maurinus et al. | 354/76 |
| 5,063,400 | 11/1991 | Takei et al. | 354/288 |
| 5,083,146 | 1/1992 | Veda | 354/149.11 |
| 5,170,199 | 12/1992 | Nakai et al. | 354/126 |
| 5,210,557 | 5/1993 | Kameyama et al. | 354/120 |
| 5,255,041 | 10/1993 | Lyon et al. | 354/288 |
| 5,329,330 | 7/1994 | Sakai et al. | 354/288 |
| 5,353,165 | 10/1994 | VanDeMoere et al. | 359/819 |

FOREIGN PATENT DOCUMENTS

| | | |
|---|---|---|
| 650908 | 10/1937 | Germany. |
| 2002361 | 7/1975 | Germany. |
| 3146026 | 6/1982 | Germany. |
| 912942 | 12/1962 | United Kingdom. |
| 1196632 | 1/1970 | United Kingdom. |

*Primary Examiner*—Michael L. Gellner
*Assistant Examiner*—Eddie C. Lee
*Attorney, Agent, or Firm*—Roger A. Fields

[57] ABSTRACT

A unibody viewfinder for use in a single use camera includes a pair of optically aligned lenses integrally connected to a support structure which may, for instance, be at least a portion of the top surface of such a camera. A mold and method for making the viewfinder in a single molding process includes means for retracting the lens-forming elements to allow release of the viewfinder despite the presence of undercuts in the finished product. A process for recycling a single use camera having such a unibody viewfinder also is disclosed.

11 Claims, 13 Drawing Sheets

ONE PIECE VIEWFINDER AND FABRICATION PROCESS

CROSS-REFERENCE TO RELATED APPLICATIONS

This application is a continuation-in-part of application Ser. No. 08/292,029, filed Aug. 14, 1994, now abandoned, which is a continuation of application Ser. No. 07/945,186, filed Sep. 15, 1992, now U.S. Pat. No. 5,353,165.

The ornamental aspects of features of the single use camera illustrated in FIGS. 17–21 herein are subjects of the following copending design applications commonly assigned with the present application: Flash Camera with Cover Label, Ser. No. 28/027,928, Flash Camera, Ser. No. 29/027,930, now U.S. Pat. No. D369,820, Cover Label for Flash Camera, Ser. No. 29/027,933, all of which were filed on Sep. 1, 1994; and Rear Cover of Flash Camera, Ser. No. 29/029,992, fled on Oct. 29, 1994. Other features of the single use camera illustrated in FIGS. 17–21 are subjects of the following utility applications commonly assigned with the present application and filed simultaneously herewith: Single Touch Flash Charger Control, Ser. No. 08/330,658, and Anamorphic Lens For A Photographic Flash Assembly, Ser. No. 08/330,637.

FIELD OF THE INVENTION

The invention relates generally to optical systems and, more particularly, to a complete optical view finder system and processes for making a viewfinder system and for recycling a single use camera having such a viewfinder system.

BACKGROUND OF THE INVENTION

Recent manufacturing breakthroughs have made it possible to manufacture inexpensive, single use cameras. Such cameras typically include all the basis necessities for capturing an image on film, but at the same time are constructed from inexpensive materials and hence can either be discarded after a single use or recycled by a manufacturer and resold. The necessary features in such a single use camera include a roll of film, a taking lens, a shutter release, a film advance and a viewfinder.

For single use cameras to be manufactured profitably, it is essential that they be capable of being manufactured from inexpensive materials and with a minimum of assembly steps. To accomplish this, it has been the practice of many single use camera manufacturers to use an "air viewfinder" to act as a pointing and framing guide for the camera user. An air viewfinder typically is simply an opening extending through the camera from front to back, the central axis of the opening extending generally in the same direction as the focal axis of the taking lens of the camera. Alternatively, an air viewfinder may include a framing guide, such as a sight, which can be a plastic member disposed within the viewfinder to assist the user in determining the boundaries of an image to be photographed.

For instance, U.S. Pat. No. 4,812,866 to Ushiro, et al., describes a molded front cover of a single use camera which has integrally molded therein a single lens. The lens can be either a taking lens or a viewfinder lens. Such a viewfinder does not yield an optically enhanced image, however.

Conversely, viewfinders in conventional cameras are "optical viewfinders". An optical viewfinder provides an optically aided view of the image to be captured on film. An optically aided view can more accurately convey to the user the boundaries of the image to be captured. An optical viewfinder employs two or more viewfinder elements, or lenses, mounted in a holder. In multiple-use cameras, which are considerably more expensive to manufacture than single use cameras, multi-lens viewfinders are assembled from separately manufactured lenses. This multi-lens viewfinder design has been avoided in single use cameras, however, because of the prohibitive cost. To incorporate such viewfinders in single use cameras, it has been necessary to manufacture each lens separately, assemble the lenses to form a viewfinder system and then incorporate the viewfinder system into the camera. Not only do the separate steps of manufacture and assembly impose extra cost in their own right, extra care must be taken during assembly to ensure that the lenses are kept clean and aligned properly, further adding to the expense.

To reduce cost, it would be desirable to form the viewfinder system in one molding process. Until now, however, no method has existed for forming an optical viewfinder system in a single molding process. The inability to form such a system arises from the necessity that the lenses be curved to present an optically aided view of the image to be photographed. As is known in molding technology, curves and indentations in an object to be molded create "undercuts," or protrusions, into the molded object. These undercuts prevent the molded object from being ejected from a typical mold without destroying either the mold or the molded object.

While it is known to mold in a single molding process items having undercuts, the known techniques have yet to be applied to the lens-crafting art. The difficulty with manufacturing lenses lies in the strict requirements for mold surface position and texture. The surfaces of a lens-forming mold must be highly polished in order to yield a product with surfaces of optical quality without post-molding polishing of the formed lenses.

Thus, a need has arisen for a method of producing an optical viewfinder system in a single-step molding process, despite the presence of undercuts which make part ejection difficult.

PROBLEM TO BE SOLVED

It is an object of the invention to provide a mold and a molding process which overcome the problems associated with molding multi-lens viewfinders described above. It is a further object of the invention to provide an optical viewfinder which can be manufactured simply and inexpensively, and recycled.

SUMMARY OF THE INVENTION

Briefly described, the invention provides a method of making a unibody viewfinder having a plurality of lenses aligned along a common principal axis, in which the viewfinder has at least one projection, and includes providing a mold having inner surfaces which define a molding volume in the shape of the viewfinder. A lens forming material is then introduced into the mold. The inner surfaces of the mold include a plurality of pairs of highly polished surfaces for molding opposite sides of a plurality of the lenses. The method also includes solidifying the lens forming material in the shape of the molding volume, such that the lens forming material is hardened into the shape of the viewfinder. Finally, the method includes the removal of the viewfinder from the mold.

Another aspect of the invention is to provide a single use camera that may incorporate previously used elements in a recycled camera, including a camera body having a film cassette chamber. The ability to recycle parts promotes the efficient use of scarce natural resources, saves space in landfills, and reduces the cost of camera. To this end, the camera body supports single use camera parts, including a unibody view finder formed from a support and a plurality of lenses integrally molded with the support. Many single use camera parts, including the unibody viewfinder, may be recycled in any particular camera. An unexposed roll of film then is mounted in the film cassette chamber of the camera body.

Still another feature of the invention is to provide a method of recycling a single use camera by incorporating previously used single use camera parts comprising the steps of: providing a previously used camera body having a film cassette chamber; supporting in the camera body previously used single use camera parts, including a unibody viewfinder formed from a support and a plurality of lenses integrally molded with the support; and loading an unexposed roll of film into the film cassette chamber of the camera body.

DETAILED DESCRIPTION

Figure 1C:
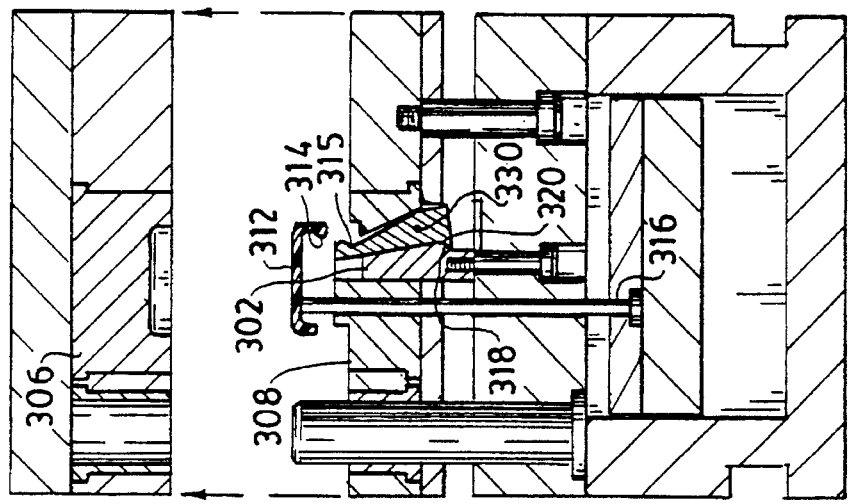
FIG. 1(a), 1(b) and 1(c) are the sequential views of a molding device and process useful for molding items having undercuts therein.
Figure 1B:
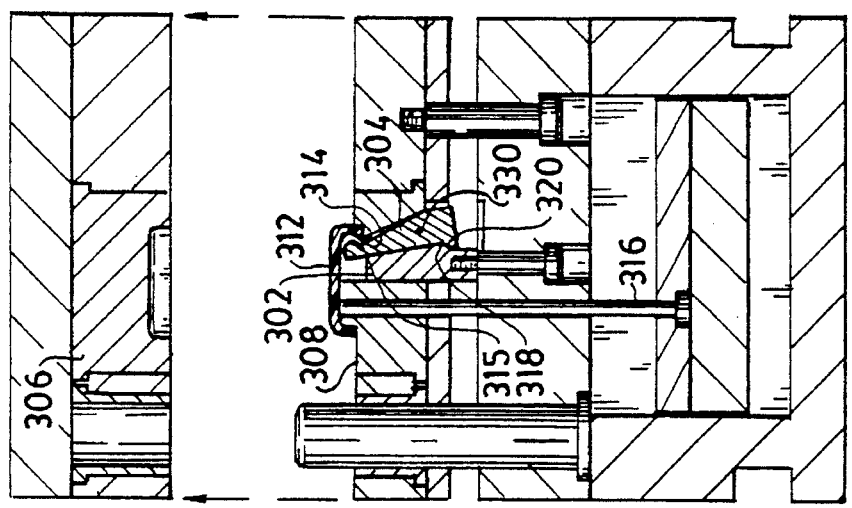
Figure 1A:
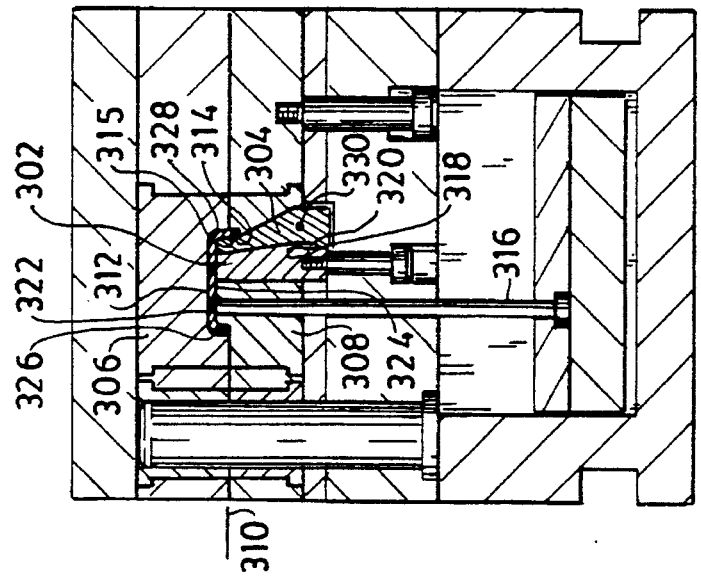

FIG. 1 shows a generalized, sequential view of a molding apparatus in accordance with the invention. The mold depicted in FIGS. 1(a)–1(c) operates as follows. FIG. 1(a) shows the mold in its molding position, i.e., all the components of the mold are disposed to form a molding volume in which piece 312 can be formed. The mold has an upper molding member 306, a lower molding member 308, a wedge 302 a flipper 304, and an ejection pin 316. Wedge 302 and flipper 304 have protrusions 318 and 320, respectively which are aligned vertically for contact when the wedge slides downward.

When the mold is in its molding position as shown in FIG 1(a), the parts of the mold are situated to form a molding volume with smooth upper and lower surfaces 322 and 324, downwardly extending portions 326 and 328 and indentation 315. The mold in FIG. 1 parts along parting line 310.

After a material has been introduced into the molding volume and been given time to harden into piece 312, it can be seen that it would be impossible to eject the piece vertically with ejection pin 316. This is because indentation 315 causes the formation of a protrusion 314 in piece 312. This protrusion locks the piece into the mold.

FIG. 1(b) shows how the piece is released. Upper member 306 is moved upwardly away from lower member 308. At the same time, wedge 302, which is slidably attached to lower member 308, is caused to slide downward. The downward motion of wedge 302 causes the protrusion 318 thereon to contract the protrusion 320 on Flipper 304. This contact causes flipper 304 to pivot counterclockwise about its pivot 330. The pivoting action releases the protrusion 314 from indentation 315 and the piece can be ejected, as shown in FIG. 1(c).

Figure 2:
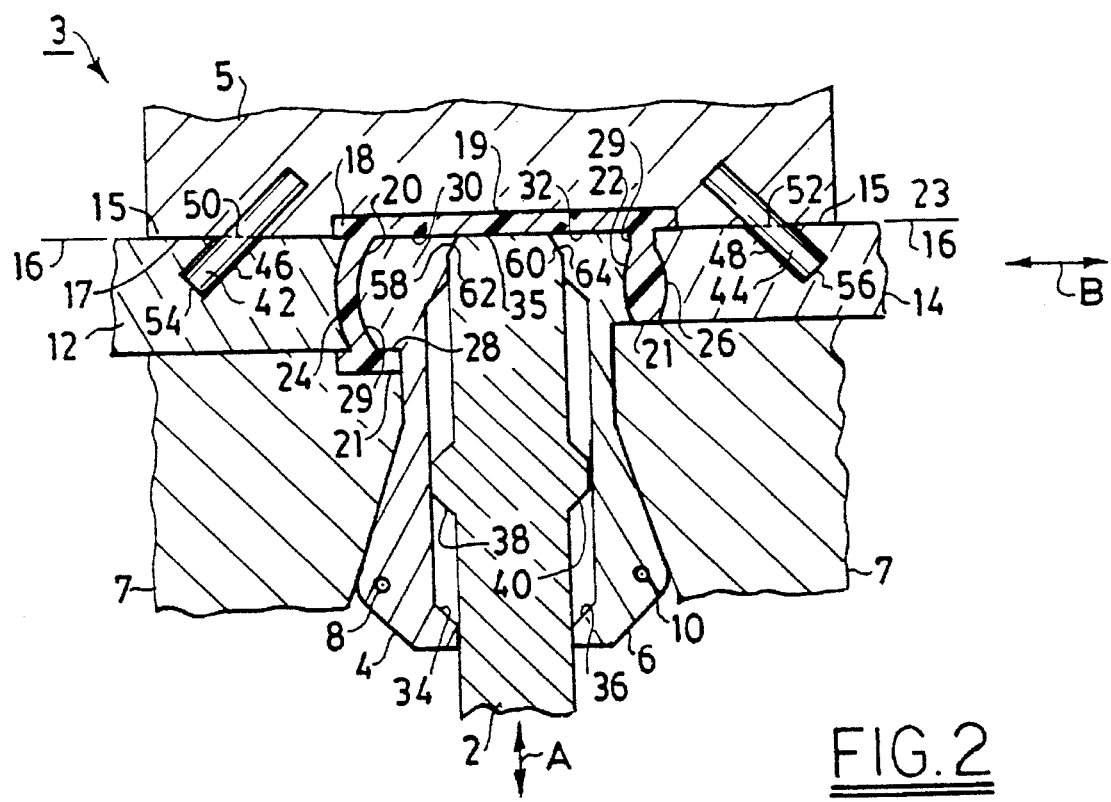
FIG. 2 is a side cross-sectional view of a portion of a preferred molding apparatus in accordance with the invention.
Figure 6:
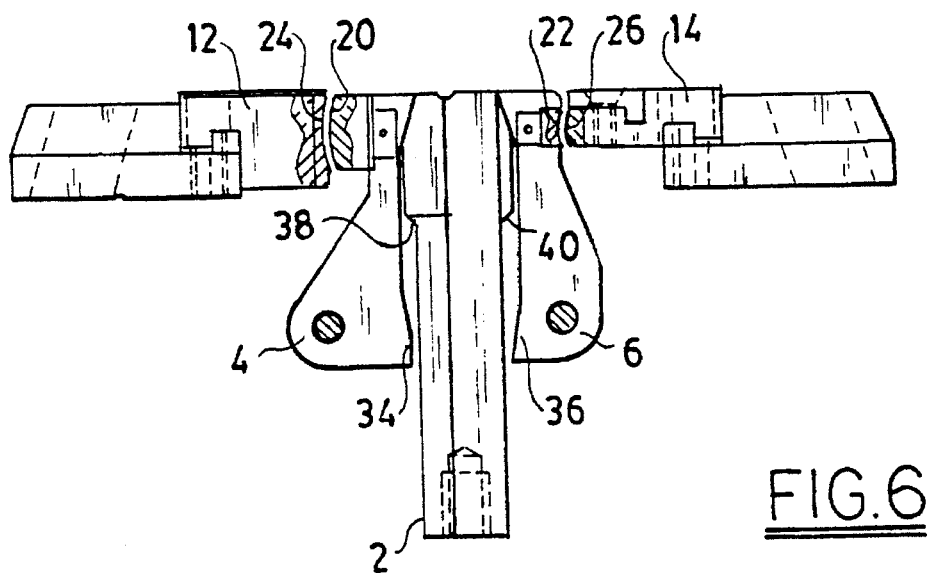
FIG. 6 is a cross-sectional view of a flipper and wedge mechanism.
Figure 11:
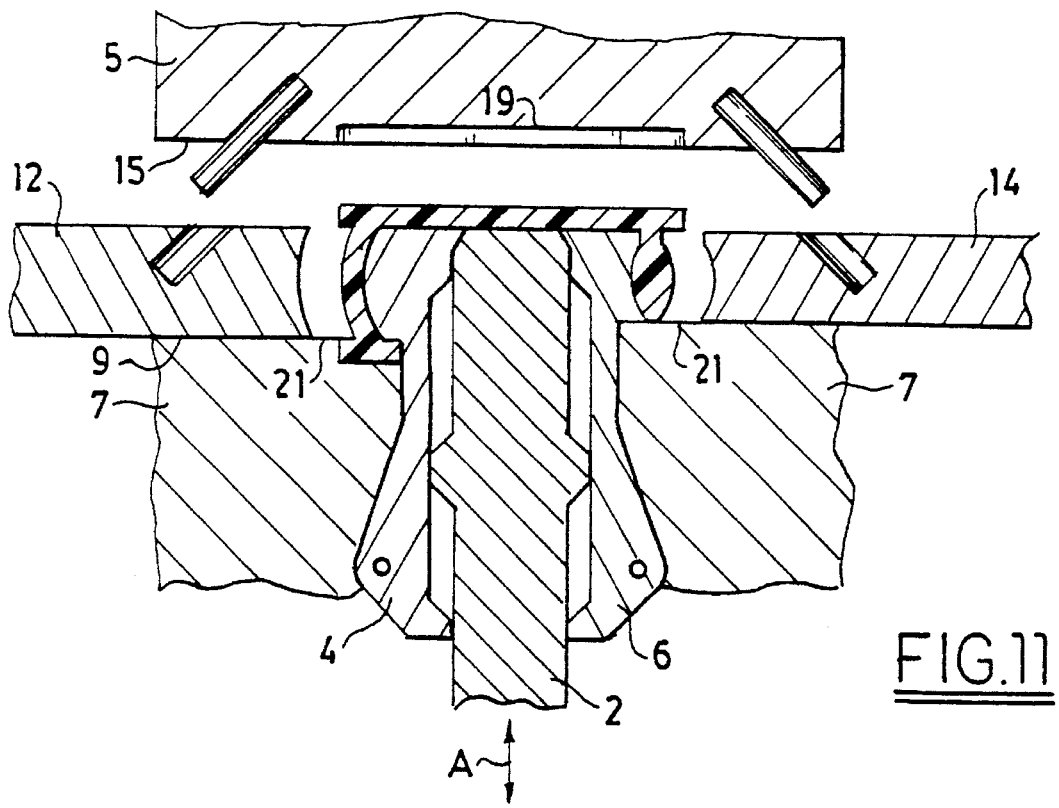
FIG. 11 is a cross-sectional view of the mold of FIG. 2 in its release position.

FIGS. 2, 6, and 11 show side views of a preferred molding apparatus in accordance with the invention. Common reference numbers are used in FIGS. 2 and 6 to refer to common elements. Referring to FIG. 2, mold 3 can be used to produce a viewfinder system in accordance with the invention in a single molding operation. Mold 3 includes upper molding member 5 and lower molding member 7. Member 5 includes beating surface 15, and members 5 and 7 include molding surfaces 19 and 21, respectively. These surfaces can best be seen in FIG. 11. Members 5 and 7 are separable at parting line 16. When the members are closed together, as shown in FIG. 2, the mold is in its molding position. Members 5 and 7 can be separated along parting line 16, and the mold can then assume a release position, as shown in FIG. 11. Mold 3 also includes wedge 2, which is attached to lower molding member 7 and is slidable in the direction shown by arrow A. Flippers 4 and 6 are also attached to lower member 7, and each is pivotable about pivot points 8 and 10.

Flippers 4 and 6 have attached thereto lens-forming nubbins 20 and 22, respectively. Slides 12 and 14 are mounted to the upper surface 9 of lower member 7 and are slidable in the direction indicated by arrow B. Slides 12 and 14 have attached thereto a lens forming nubbin 24 and 26, respectively, positioned adjacent lens nubbins 20 and 22, respectively, on flippers 4 and 6. Slides 12 and 14 have respective upper bearing surfaces 17 and 23, which bear against bearing surface 15 of upper member 5 when the mold is in its molding position as shown in FIG. 2.

As shown in FIG. 2, the molding surfaces of upper and lower members 5 and 7 form a portion of molding volume 18. The boundaries of the molding volume are further defined by lens nubbins 20, 22, 24 and 26, sides 28 of flipper 4, upper surfaces 30 and 32 of flippers 4 and 6, and the upper surface 35 of wedge 2. The molding volume is in the shape of the viewfinder of the invention.

When mold 3 is in the molding position, lens forming material is introduced, for instance by injection, into molding volume 18 by means of a gate, not shown. The material conforms to the shape of the volume, filling all the voids and spaces within the volume. After volume 18 has been completely filled with the lens forming material, the material is cooled and thus hardened. The hardened material permanently assumes the shape of the volume 18, which is in the shape of the viewfinder of the invention.

The hardened material, now the viewfinder, is then removed from mold 3. The molding volume 18 contains several regions which result in the formation of what are known as "undercuts". Undercuts are indentations in the molding volume which would prevent the molded material from being removed from the mold in a vertical fashion without destroying the mold or the viewfinder. Each of the undercuts is associated with a lens nubbin, and each is indicated by points 29 in FIG. 2.

The apparatus and method of the invention provide means for releasing the undercut portions of the viewfinder to allow it to be removed without damage. In a preferred embodiment, the viewfinder is removed by moving the lens nubbins away from the viewfinder.

Figure 12:
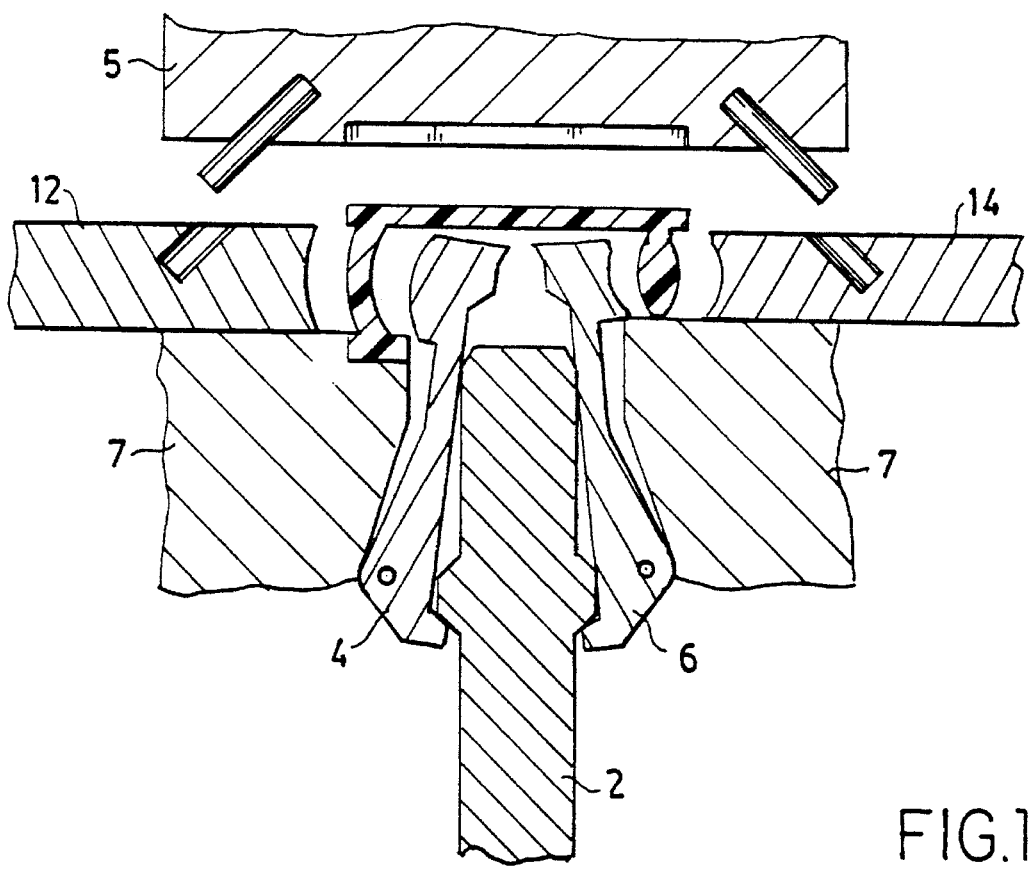
FIG. 12 is another cross-sectional diagram of the mold of FIG. 2 in its release position.

The lens nubbins 20 and 22 are removed from contact with the viewfinder by means of the interaction of flippers 4 and 6 and wedge 2. As can be seen clearly in FIG. 6, Flippers 4 and 6 have projections, 34 and 36, respectively. The projections 34 and 36 are disposed in the path of motion of projections 38 and 40 of wedge 2. To retract lens nubbins 20 and 22 from the viewfinder, wedge 2, which is slidably attached to lower molding member 7, is caused to slide downward from its molding position, as shown if FIG. 2, to its release position, as shown in FIG. 12. The downward sliding action causes the protrusions 38 and 40 of wedge 2 t come into contact with protrusions 34 and 36, respectively, of flippers 4 and 6. This contact causes a caming action on flippers 4 and 6, whereby flippers 4 and 6 pivot about pivot points 8 and 10. This pivoting action directs lens nubbins 20 and 22 away from the surface of the lenses on the formed viewfinder. Thus, the undercuts 29 associated with lens nubbins 20 and 22 are released. While the preferred embodiment can also provide for the wedge remaining stationary and the lower member moving relative to the wedge. As long as the relative motion between the wedge and lower molding member is as described above, the mold of the invention will operate as described.

Figure 7C:
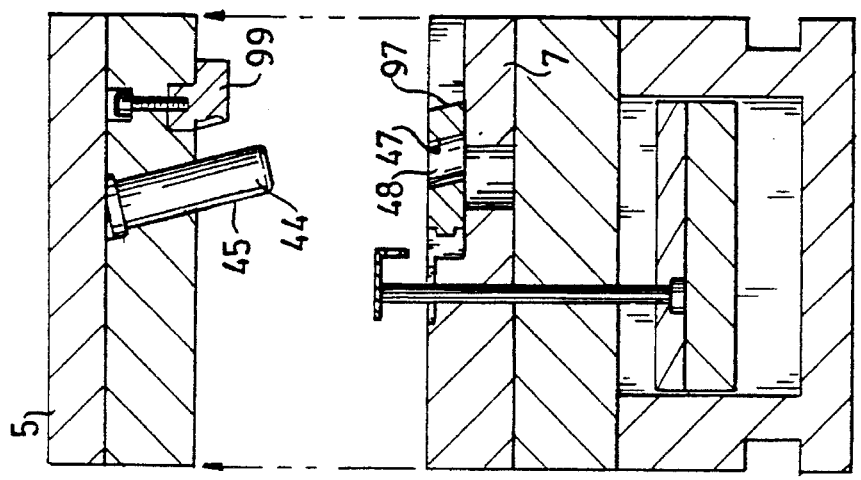
FIG. 7(a), 7(b) and 7(c) are sequential views of the slide mechanism of the mold of the invention.
Figure 7B:
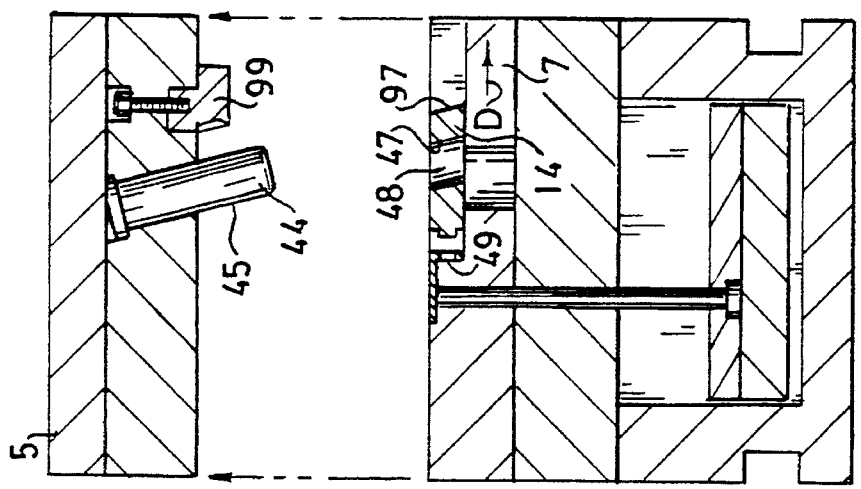
Figure 7A:
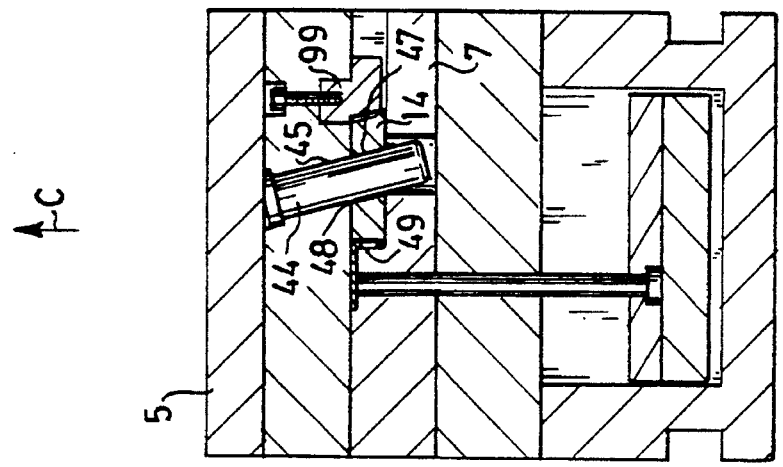

As can also be seen in FIG. 2, undercuts 29 formed by lens nubbins 24 and 26 also restrict the release of the hardened material from mold 3. Movement of lens nubbins 24 and 26 away from the formed lens surfaces is necessary to release the viewfinder. Lens nubbins 24 and 26, which are attached to slides 12 and 14, respectively, are moved away from the formed lens surfaces by moving slides 12 and 14 away from molding volume 18. Means for moving slides 12 and 14 are provided by the pins 42 and 44, which extend from the bearing surface 15 of upper member 5, and openings 46 and 48 in the upper surfaces of slides 12 and 14. Pins 42 and 44 have bases 50 and 52 and ends 54 and 56, and are angled away from the molding volume 18. The angling of the pins away from molding volume 18 results in the bases 50 and 52 being disposed closer to the molding volume than ends 54 and 56. When the bearing surfaces of upper and lower members 5 and 7 are joined at parting line 16, pines 42 and 44 are fully inserted in openings 46 and 48. Openings 46 and 48 are each angled in the same direction as pins 42 and 44, thus resulting in a complementary fit of the pins and openings. Referring to FIG. 7(a)–(c), final molding position is achieved by means of cam lock 99, which interfaces with surface 97 of slide 14. Cam lock 99 positions slide 14 in its molding position. In this fully inserted position, the openings 46 and 48 are aligned with the perimeter of the bases 50 and 52, and therefore slides 12 and 14 are positioned at their closest positions to the molding volume 18. When upper and lower members 5 and 7 are separated at parting line 16, pins 42 and 44 are raised. This rasing action causes the exterior sides (relative to the center of the pin and the center of the mold) of the pins to bear against the walls of openings 46 and 48. This bearing action exerts an outward force on slides 12 and 14, which then slide in the direction of the force, releasing lens nubbins 24 and 26 from the molded lens surfaces of the viewfinder. The slides in their retracted positions can be seen in FIG. 11. When all lens nubbins have been retracted from the viewfinder, the viewfinder is free to be ejected from the mold.

Mold 3 is restored to its molding position as follows. To return lens nubbins 20 and 22 to their molding position, wedge 2 is moved upward. The upward motion causes surfaces 58 and 60 of the upper portion of wedge 2 to contact surfaces 62 and 64 of flippers 4 and 6. This contact forces the flippers to pivot about pivot points 8 and 10, and lens nubbins 20 and 22 are returned to their molding position.

Lens nubbins 24 and 26 are returned to their molding positions by repositioning upper and lower molding members 5 and 7 such that their bearing surfaces are in contact. When upper member 5 is lowered toward lower member 7, pins 42 and 44 are returned to openings 46 and 48. The interior sides relative to molding volume 18 of pins 42 and 44 contact the wall of openings 46 and 48 and exert an inward force on slides 12 and 14. This inward force causes the slides to move toward the molding volume and lens nubbins 24 and 26 are thus returned to their molding positions. A sequential view of the operation of a slide mechanism is shown in FIG. 7.

FIG. 7(a) shows the mold in its molding position. Pin 44 is fully inserted into opening 48. As upper member 5 is drawn in the direction of arrow C in FIG. 7(a), the exterior side 45 of pin 44 bears against the wall 47 of opening 48. This contact drives slide 14 in the direction of arrow D in FIG. 7(b). The undercut 49 being released, the piece is free to be ejected, as shown in FIG. 7(c). If the sequence is reversed, the mold is returned to its molding position.

To obtain lenses of suitable optical quality without the need for post-molding buffing, the lens nubbins are provided with surfaces which are highly polished. These highly polished surfaces, which constitute the lens-forming elements of the mold, provide a suitable finish to the resulting lenses. Lens nubbins 20, 22, 24 and 26 preferably are constructed of steel, but any material which can be suitably polished and which can withstand the high molding temperatures without deformation is acceptable. To obtain a suitable finish on the lens surfaces, it is preferably that the surface of the lens nubbins have roughness characteristics as shown in Table 1.

TABLE 1

| Lens Nubbin Corresponding to Surface | Power | Irregularity | Asphericity |
|---|---|---|---|
| 110, 114 116* (spherical) | 2½ waves | ≦½ wave | ≦½ wave |
| 112* | 1–2 waves | ≦½ wave | ≦½ wave |
| Surface Roughness | | | |
| 10–200 A rms | | | |
| 50–300 A rms | | | |

Figure 5:
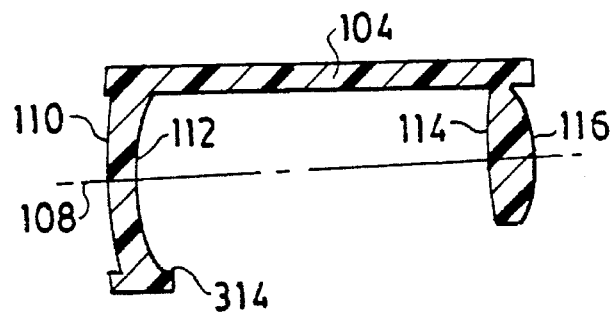
FIG. 5 is a sectional view of the system of FIG. 4.
Figure 13:
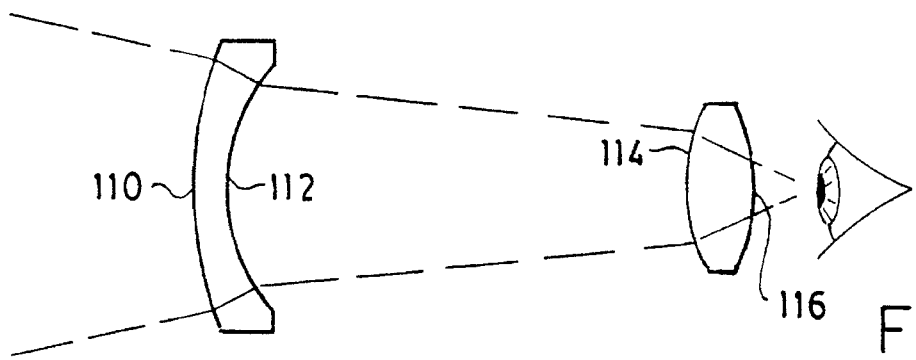
FIG. 13 is a schematic view of the viewfinder system of the invention.

*See FIGS. 5 and 13.

The rest of the mold elements preferably are constructed from high carbon steel, but any material capable of withstanding the pressure and temperature levels associated with the above-described mold and process will suffice. Acceptable materials for constructing the viewfinder system of the invention are any moldable materials of a proper refractive index suitable to form optical lenses. The preferred material is a clear polycarbonate. Tinted polycarbonate can also be used for applications requiting tinted or clear acrylic, polystyrene, thermoplastic polyesters, olefin, or any transparent moldable material.

Figure 3:
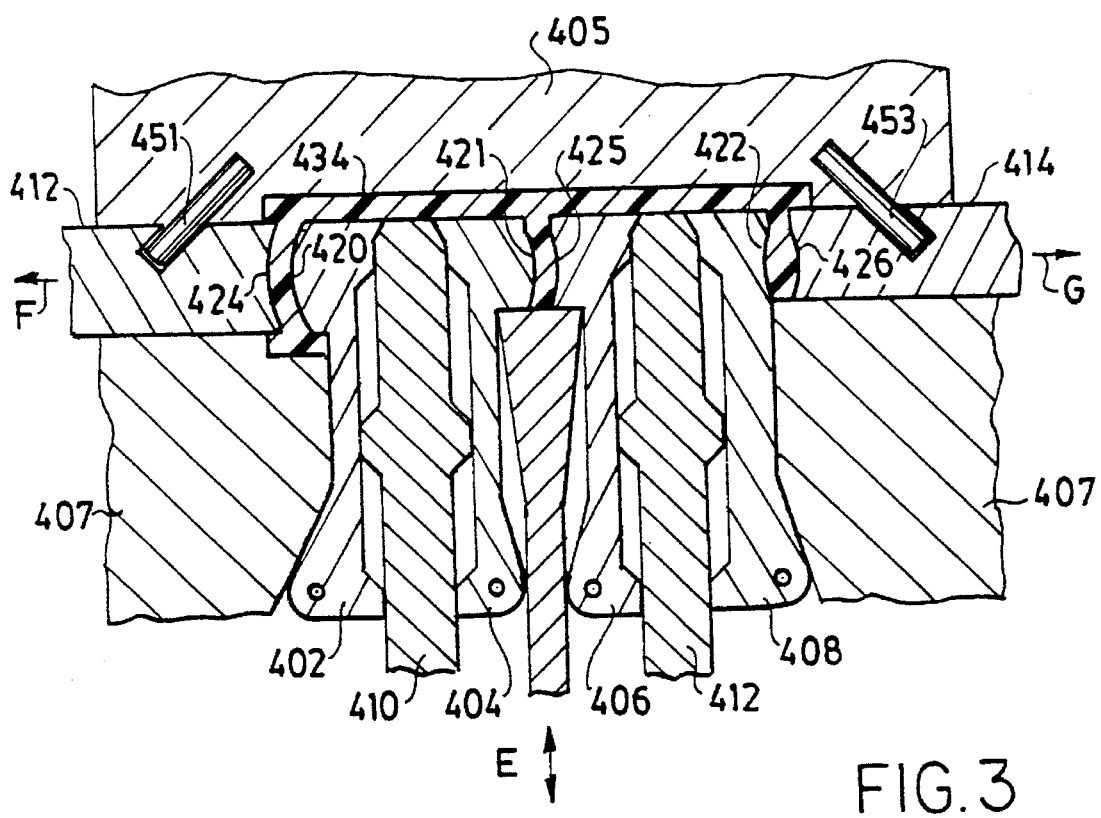
FIG. 3 is an alternative embodiment of a molding apparatus in accordance with the invention.

While the mold and process of the invention each have been described for the molding of a two lens viewfinder system, the mold and process can be adapted for molding viewfinders having three or more such lenses. This can be accomplished by including more wedges, 410 and 412, and flippers, 402, 404, 406 and 408 as shown in FIG. 3. Such an arrangement can accommodate the production of three lenses in a viewfinder system. The operation of this embodiment is the same as that of the embodiment shown in FIG. 2. Upper member 405 and lower member 407, when in their relative positions as shown in FIG. 3, cream a molding volume 434. The volume is further defined by lens nubbins 420, 421, 425 and 422 attached to flippers 402, 404, 406 and 408, respectively, and lens nubbins 424 and 426, attached to slides 412 and 414 respectively. To release the undercuts, the relative movement of the wedges to the flippers is in the direction of arrow E. This causes the flippers to pivot and the undercuts associated with the flippers are released. Also, slides 412 and 414 are moved in directions F and G, respectively, by means of the pin and opening mechanisms 451 and 453, which operate in the same manner as the similar mechanism described with respect to FIG. 7. The mold and process can be adapted to produce a limitless number of such lenses.

The invention has been described in a preferred embodiment as providing for retraction of lens nubbins 20 and 22 from the lens surfaces by means of pivoting flippers 4 and 6 about pivot points 8 and 10 (FIG. 2). However, the lens nubbins can alternatively be retracted by other means. For instance, a pneumatic retraction system can be used. Upon actuation, the pneumatic device would move the lens nubbins away from the lenses. Also, retraction can be performed manually. Other means can include a manual slide mechanism, which provides a drawing action to relieve the undercuts of the lens nubbins during an ejection, or various types of hydraulic, screw thread, or electromagnetic action, which can retract the lens nubbins prior to viewfinder ejection. These same alternative retraction methods can be adapted to retract slides 12 and 14 as well.

Figure 4:
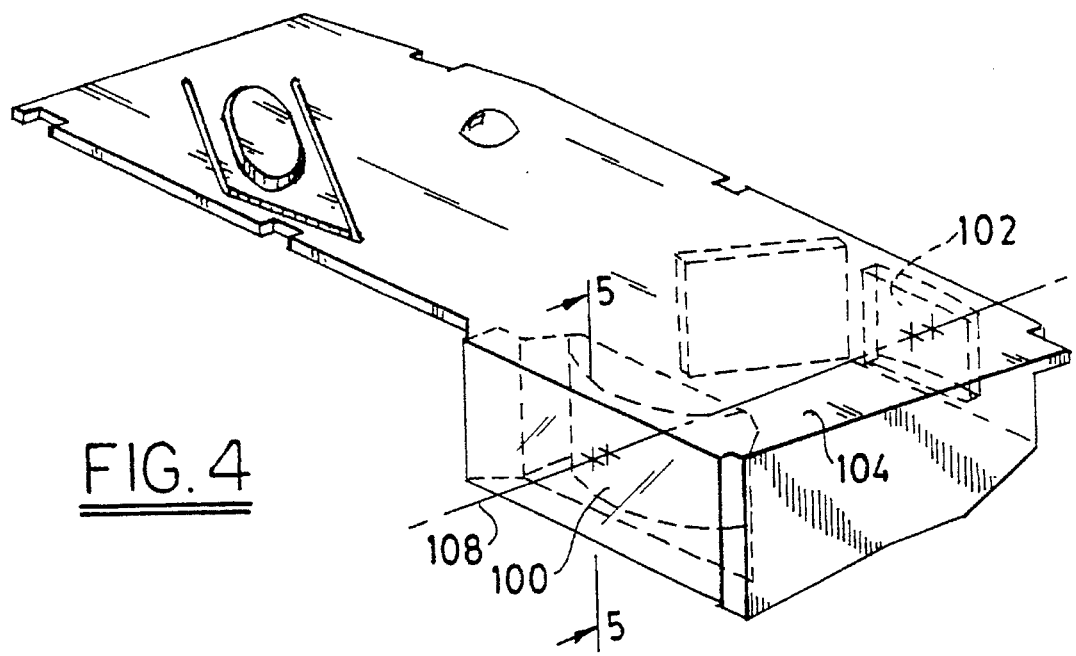
FIG. 4 is a perspective view of the view finder system made in accordance with the method of the invention and adapted for use in a single use camera.

FIGS. 4 and 5 show a first embodiment of the viewfinder of the invention. As can be seen, a front lens 100 and rear lens 102 extend perpendicularly downward from support 104. Front and rear lenses 100 and 102 and support 104 are integrally formed from a common material. The front and rear lenses are in optical alignment along principal axis 108. In the embodiment shown in FIG. 4, the viewfinder system is part of an integrated upper surface of a single use camera.

FIG. 5 is a section view of the viewfinder of FIG. 4, showing the shapes of lenses 100 and 102. This embodiment of the viewfinder can be described in terms of the geometry of the lens surfaces 110, 112, 114 and 116 (also shown in FIG. 13). Table 2 includes this descriptive data:

TABLE 2

| Surface* | Top-Bottom (mm) | Length Side-Side (mm) | Radius (mm) |
|---|---|---|---|
| 110 | 8.34 | 25.80 | 55.8727 |
| 112 | 7.84 | 22.05 | Aspherical |
| 114 | 3.06 | 11.27 | 183.336 |
| 116 | 2.96 | 10.83 | −53.3716 |

Figure 14:
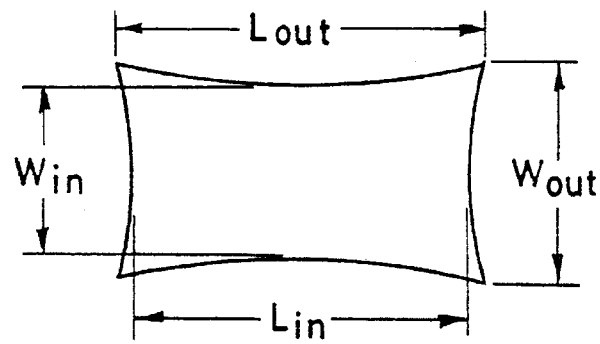
FIG. 14 is a schematic view of one of the lenses of the viewfinder shown in FIG. 13.

*See FIGS. 5 and 14.

The thickness of front lens 100 preferably is 1.250 mm along its principal axis 108 and the thickness of rear lens 102 along the axis is 2.000 mm. The distance between the front and rear lenses is approximately 32.250 mm. The length of the viewfinder from surface 110 to surface 116 is approximately 35.500 mm. The geometry described yields a 0.5x panoramic viewfinder having the following characteristics:

Apparent half field=16.9°

Half Field=31.4°

Eye Relief=21 mm

The aspheric equation for this system, $$X=cy^2/(1+(1-(K+1)c^2y^2)^{1/2}),$$

has the following variable values:
C=0.068348
K=−0.419061
Vertex Radius=14.6310

The viewfinder aberrations over the finder field 16.9 at eye can be described as follows:

| Field | Accommodation (Diopters) | Astigmatism (Diopters) | Distortion (%) | Lateral Color (Minutes of Arc) |
|---|---|---|---|---|
| Axis | −.700 | 0 | 0 | 0 |
| Top | −.703 | .045 | −.03 | 4.03 |
| Side | −.901 | .177 | −.07 | 12.74 |
| Corner | −.952 | .170 | −.06 | 13.65 |

Wherein negative astigmatism means the tangential field is closer to the eye. Other pertinent data associated with this embodiment are:

Viewfinder convergence=−0.7 diopter

Illumination format is 13.3×36.4

Print Format is 11.85×33.82

Field coverage corresponds to 85% field for a 25 mm taking lens in the camera.

The surface 110 aperture can better be defined with reference to FIG. 14 (which is a front view of surface 110), wherein:

Win=8.341 mm

Lin=25.795 mm

Wout=8.644 mm

Lout=26.134 mm

Figure 8:
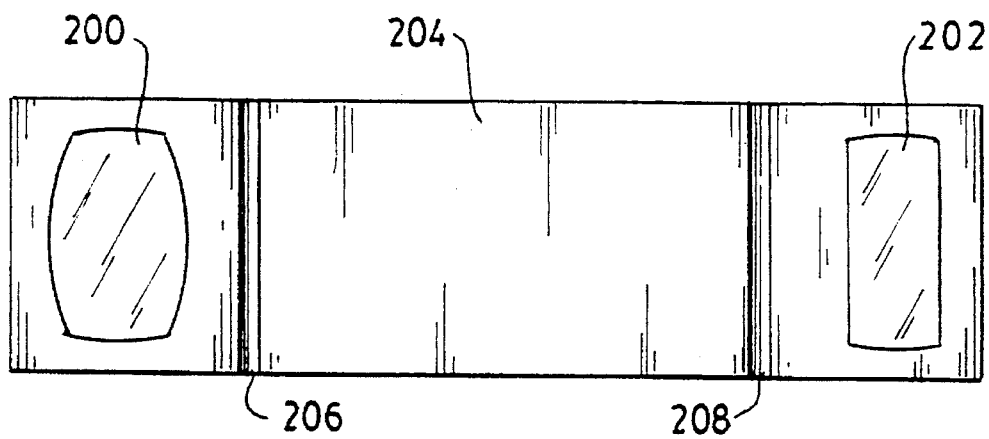
FIG. 8 is a plan view of a viewfinder in accordance with the invention.
Figure 9:
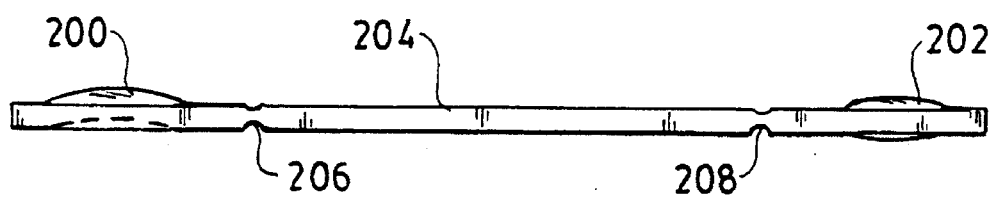
FIG. 9 is a side view of the viewfinder of FIG. 8.
Figure 10:
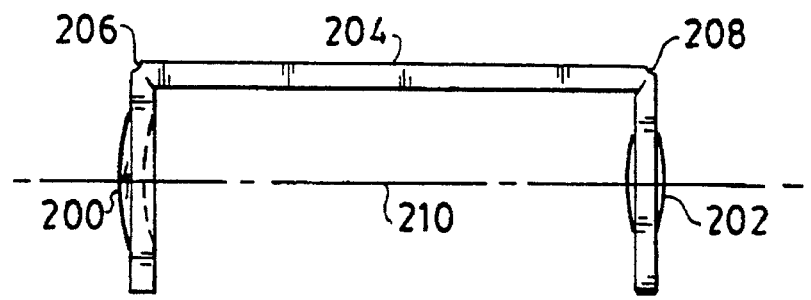
FIG. 10 is a side view of the viewfinder of FIG. 8 in which the lenses have been positioned in optical alignment.

Another embodiment of a viewfinder in accordance with the invention can be molded in the form shown in FIGS. 8–10. The viewfinder shown in FIGS. 8–10 is one in which the lenses 200 and 202 and support 204 are formed in a single plane in a single molding process. In this embodiment, the lenses 200 and 202 are each attached to opposite ends of support 204 by living hinges 206 and 208. FIG. 9 shows a side view of this configuration. To form an optical viewfinder system, lenses 200 and 202 are bent toward each other such that they are aligned along a common principal axis 210, as shown in FIG. 10.

Figure 15:
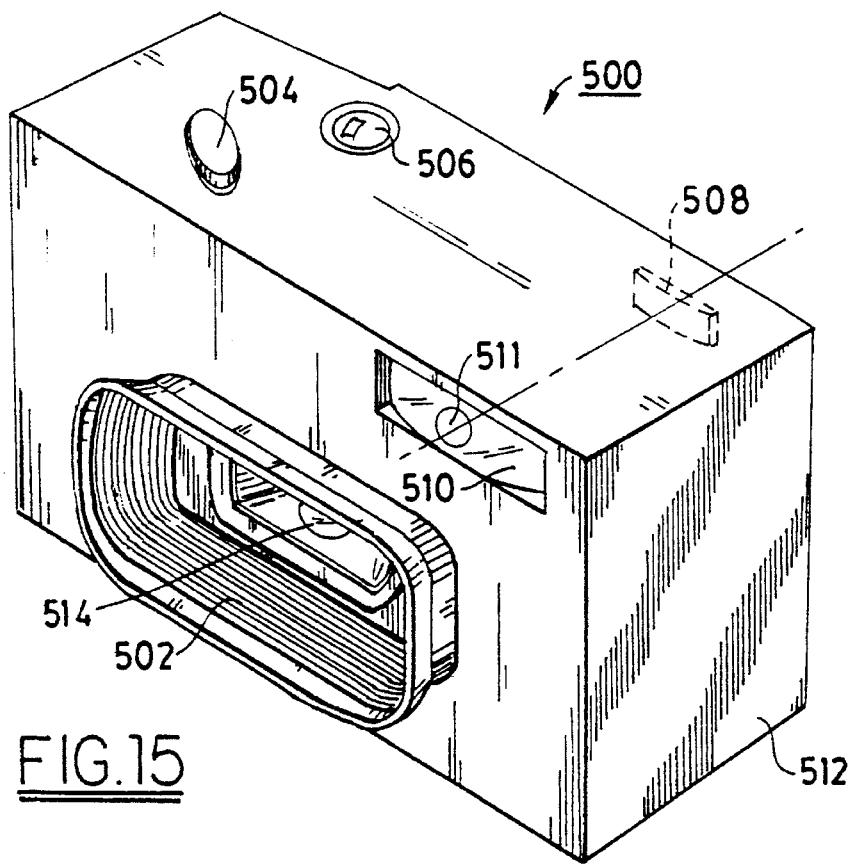
FIG. 15 shows a single use camera containing a dual lens viewfinder in accordance with the invention.

A single use camera 500 containing a dual lens viewfinder in accordance with the invention is shown in FIG. 15. The camera includes lens hood 502, shutter release 504, counter window 506, rear and front viewfinder windows 508 and 510, respectively, and inner box 512.

Box 512 encloses the camera and preferably is made of cardboard. Box 512 can have written instructions thereon to inform a user of the proper operation of the camera. The box 512 aim has a plurality of openings to allow the user access to the operational features of the camera. Specifically, there are openings for the shutter release 504, the counter window 506, the viewfinder lenses 508 and 510, and the taking lens 514 and lens hood 502. Lens 510 can have etched thereon an aiming means 511, which can be a ring.

Figure 16:
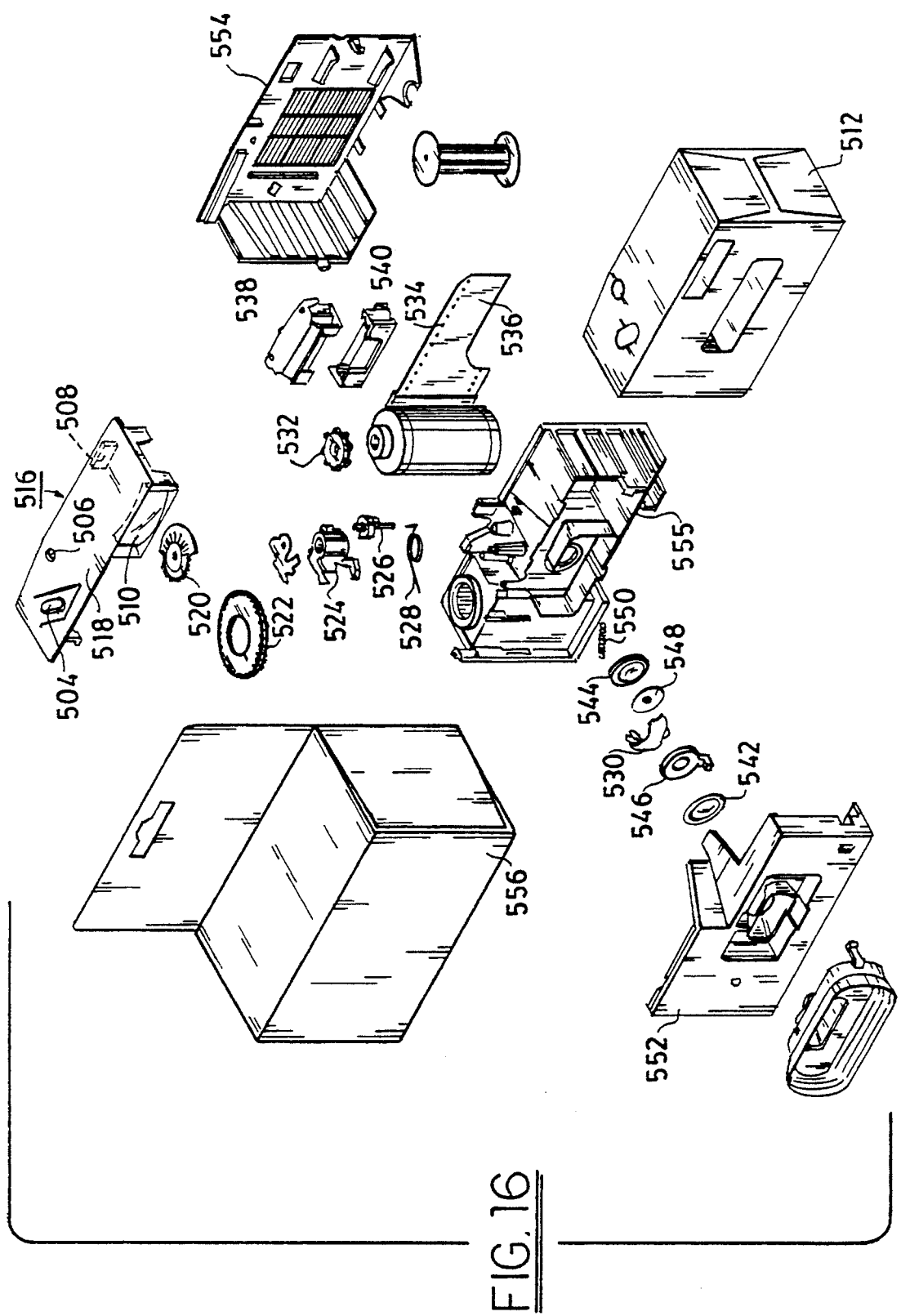
FIG. 16 is an exploded view of the single use camera of FIG. 15.

FIG. 16 shows an exploded view of the single use camera of FIG. 15. The camera includes top cover 516, which includes rear and front viewfinder lenses 508 and 510. Top cover 516 also includes support 518, which acts as the upper surface of the camera and has integrally formed therein the frame counter window 506, which can have magnification capability, and shutter release 504.

The camera also includes frame counter 520, which displays to the user the number of frames exposed to date. Thumb wheel 522, which is attached to counter 520, allows the user to manually advance the film when a frame has been exposed. Metering lever 524 positions film in place in the camera so that the image to be photographed is centered on the frame. High energy lever 526 and spring 528 cooperate to impact the shutter blade to allow light to reach the film frame. Sprocket and cam assembly 532 operate with the perforations 534 on film 536 to guide the film when it is advanced. Baffle elements 538 and 540 create a unique aspect ratio to give an optically aided effect to the image to be captured on film.

The shutter and lens system of the camera 500 has the following elements. Outer lens 542 and inner lens 544 have interposed therebetween spacer 546, which spaces the lenses a desired distance apart, shutter blade 530, which allows light to pass through inner lens 544 and onto the film, and aperture 548, which meters the intensity of light allowed into the camera. Shutter spring 550 provides the energy required to close shutter blade 530.

The elements of the camera are housed by the front cover 552, the rear cover 554, the frame 555, and the top cover 516 which one together to form a box-like camera. Assembly of the front cover 552, the rear cover 554 and the frame 555 results in formation of side covers 597 and 599 and bottom cover 595. The camera is then enclosed by the cardboard inner box 512. Outer box 556 acts as a display package.

FIGS. 17–21 show a recyclable single use camera 600 having another embodiment of a dual lens viewfinder in accordance with the invention. Recyclable single use camera 600 has three major structural components: a main body or frame 602, a front cover 620 which is attached to the front of the body, and a rear cover 630 which is attached to the rear of the body.

Figure 17:
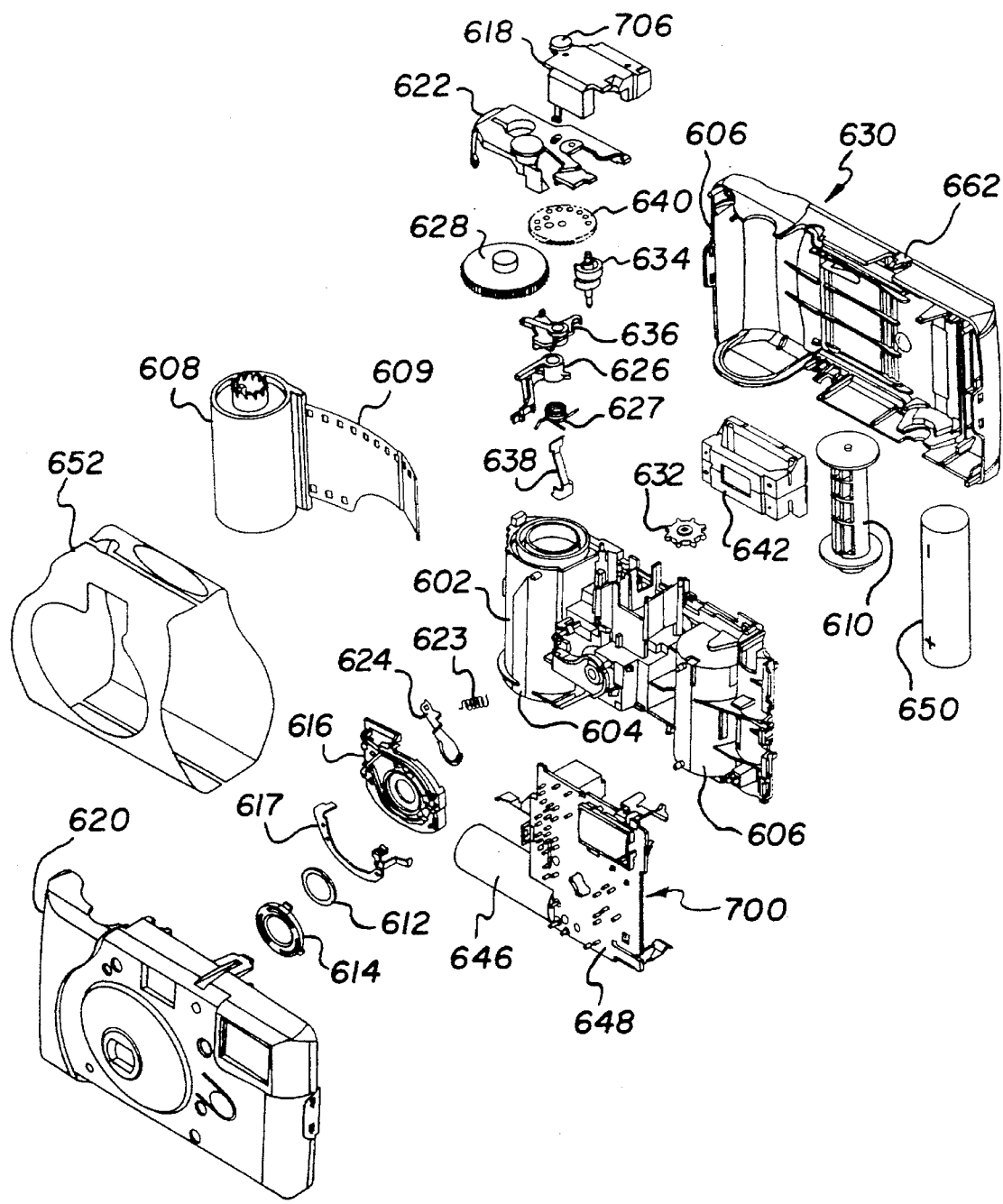
FIG. 17 is an exploded view of a recyclable single use camera utilizing another embodiment of a dual lens viewfinder made in accordance with the invention.
Figure 18:
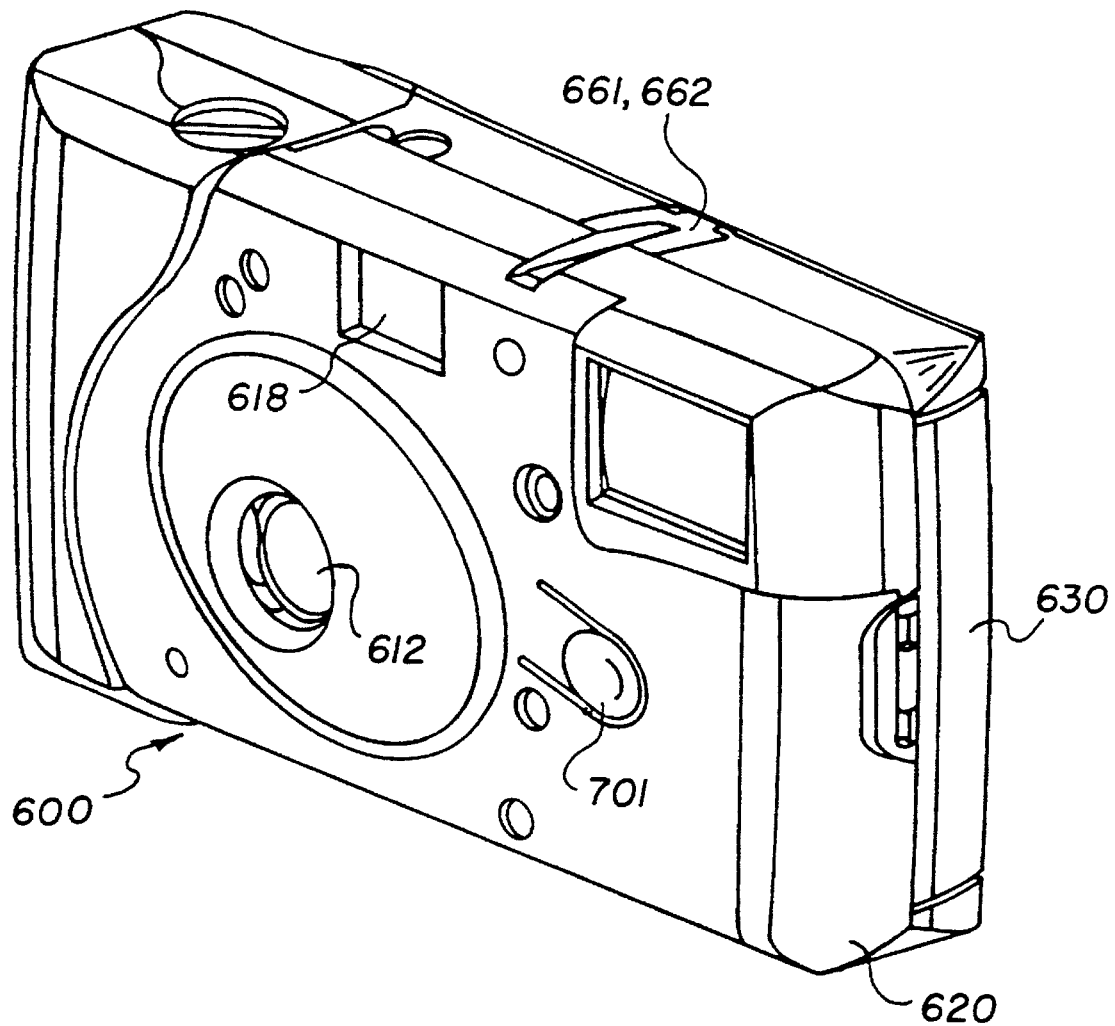
FIG. 18 is a front perspective view of the single use camera shown in FIG. 17.
Figure 19:
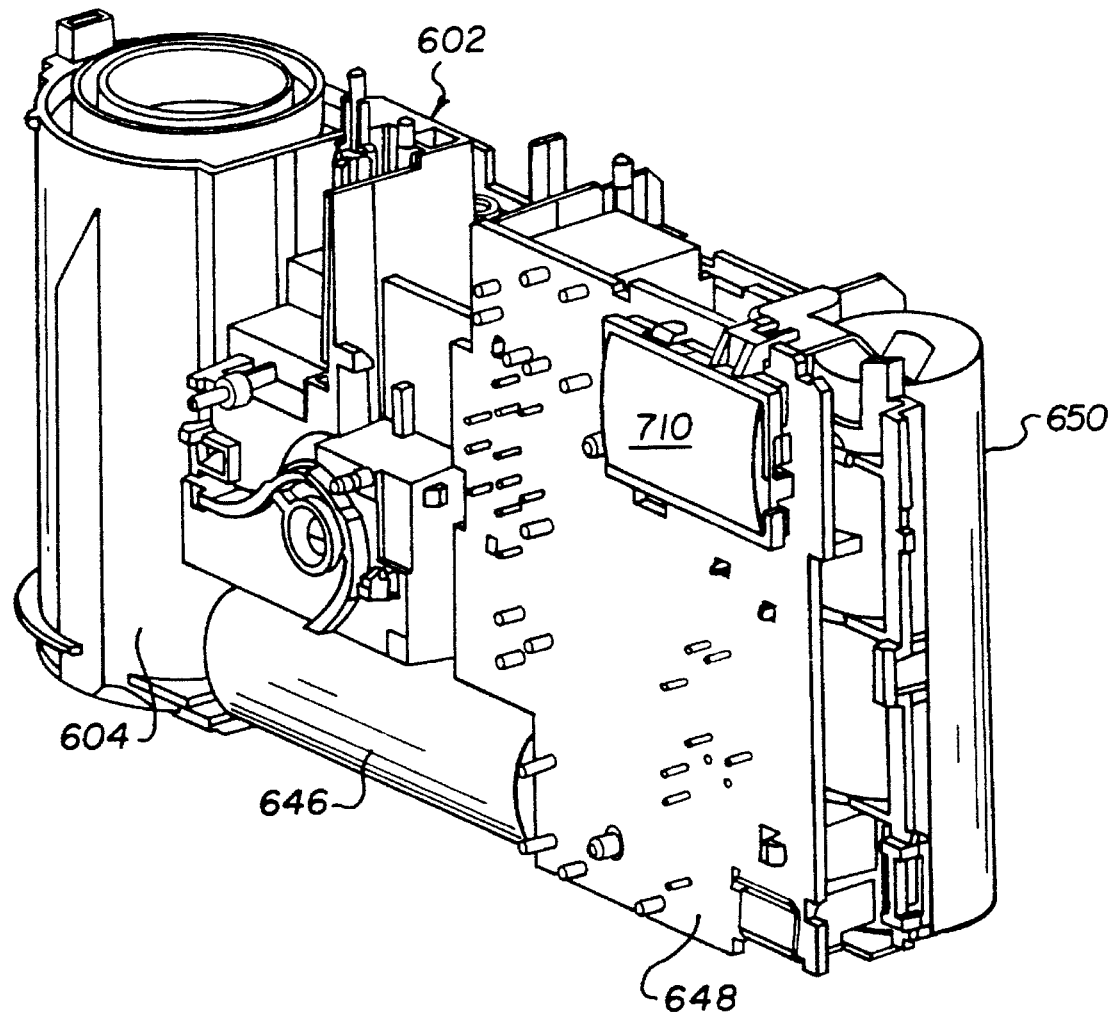
FIG. 19 is a partial front perspective view of the body of the single use camera shown in FIGS. 17–18.

Referring more specifically to the exploded view of camera 600 shown in FIG. 17, the body 602 includes a pair of formed chambers 604, 606 for respectively retaining a film cassette 608 and a take-up roll, such as spool 610. The pair of chambers 604, 606 are oppositely disposed relative to an exposure gate 607, FIG. 21. The body 602 additionally supports the following camera parts which are attached to the body prior to the attachment of the covers 620, 630: a taking lens 612 which is attached to the front of the body 602 by means of a retainer 614 and a support plate 616 sandwiching the lens therebetween; wherein the support plate has a contact switch 617; and a plastic viewfinder 618. The viewfinder 618 is a unibody viewfinder comprising a support and two optically aligned lenses, all of which are molded together from a common material in a single molding process in accordance with the invention described in detail above. Viewfinder 618 does not form the entire upper surface of the camera 600 as in the FIG. 16 embodiment; however, it may include an integrally formed, frame counter window 706, which can have magnification capability for displaying to the user either the number of frames exposed or remaining unexposed frames as indicated by a frame counter 640 mounted therebelow. Also attached to the body 602 is: a shutter mechanism 619 consisting of a keeper plate 622 having a depressible shutter release portion for tripping a shutter blade 624, biased by a spring 623 via a high-energy lever 626, which is also biased by helical spring 627; a film advancing and metering mechanism consisting of a thumbwheel 628 which engages the spool (not shown) of the loaded film cassette 608, a sprocket 632 for engaging film perforations having a spring biased portion extending into a rotable cam 634 which engages a metering lever 636 which is biased by means of a spring 638, the cam having an extending portion for contacting the frame counter 640; a light baffle 642 which is mounted into the rear of the body 602 and into the exposure gate 607, FIG. 21, or alternatively integrally formed with the body 602; and a flash illumination assembly 700, which may include a single touch flash charging and control circuit and/or an anamorphic lens 710 as described in the commonly assigned, copending utility patent applications referred to above. The disclosures of these applications are incorporated by reference herein. The flash assembly 700 includes a capacitor 646, mounted on the back side of a circuit board 648 which is powered by a battery 36. The flash assembly 700 is made operable, preferably according to this particular embodiment, by a one touch cantilevered portion 701 of the front cover 602, FIG. 18. The front cover 620 and the rear cover 630 are sandwiched and held together along with the body 602, by means discussed subsequently, to form an assembled camera. A decorative label 652 may be subsequently attached to the finished camera 600 to deter a user from opening the camera and provide a convenient place for product identification and operational information.

For a variety of reasons, including economic efficiency and environmental concerns, single use cameras, such as the described camera 600, are designed to be recycled by the manufacturer after a purchaser has completed exposing the loaded film and turned the camera over to a photofinisher for development of the film. See, for instance, U.S. Pat. No. 5,329,330 to Sakai, et al. Therefore, certain parts of the cameras are designed to last through a suitable number of cycles of sale, use, reconstruction, and resale. Conversely, for quality reasons, among others, certain parts should be replaced each time a camera is reconstructed. To successfully recycle cameras, it is important to know when particular reused camera parts should no longer be utilized because, for example, they have reached the end of their useful life. Thus, each time a camera is recycled, as described in detail below, a mark on the camera body and/or flash mechanism may be made in accordance with commonly owned U.S. Pat. No. 5,021,811 (the disclosure of which is incorporated by reference herein) to indicate the number of times it has been reconstructed.

Figure 20:
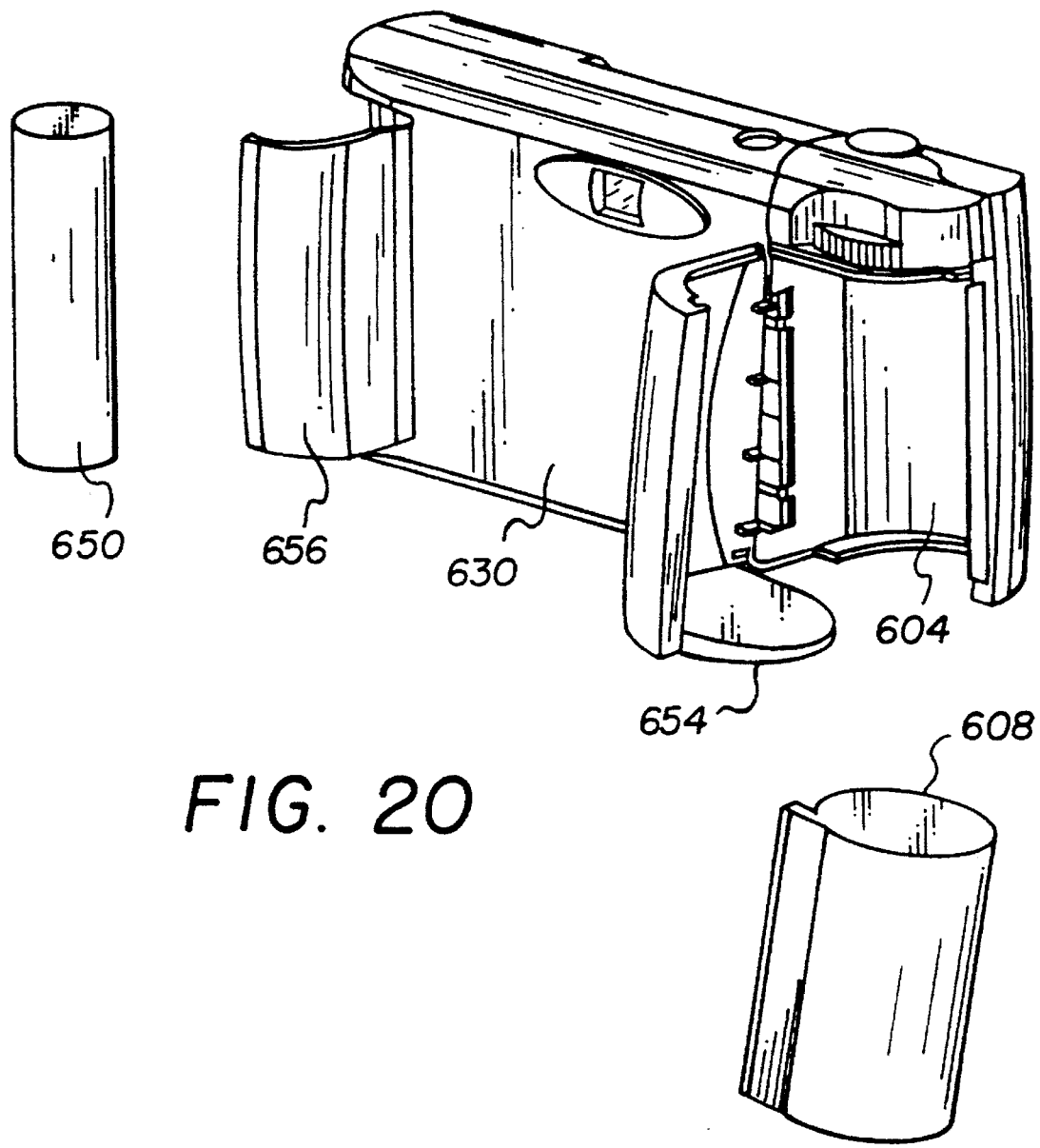
FIG. 20 is a partially exploded rear view of the camera shown in FIGS. 17–19.
Figure 21:
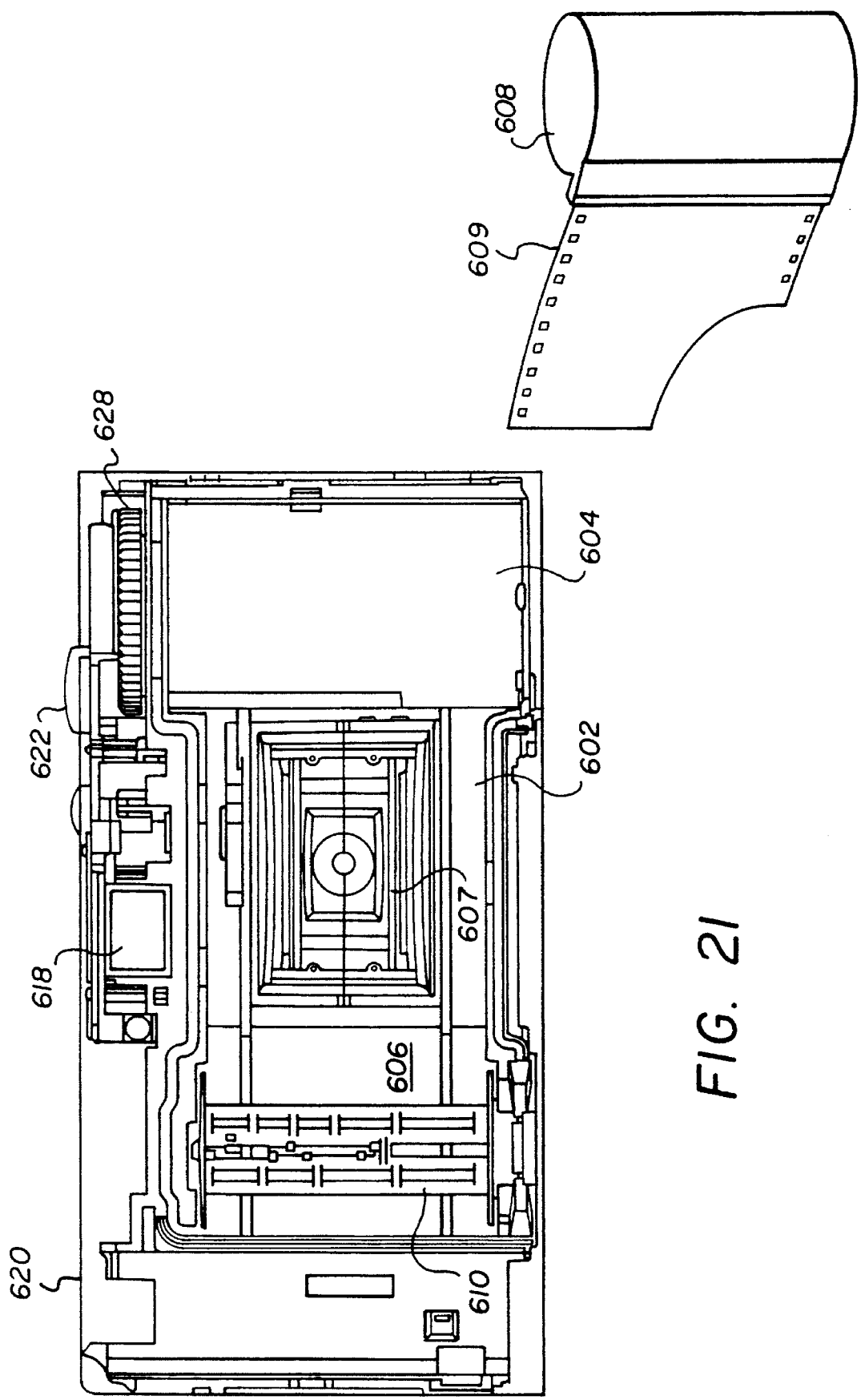
FIG. 21 is a partial rear view of the single use camera of FIG. 20 showing the reloading of a film cassette.

An efficient recycling program requires a number of competing concerns to be reconciled. In general, the manufacturer/recycler wants to facilitate easy access to the exposed film when removed by the photofinisher. This ensures that the reusable components are not damaged. On the other hand, access to the interior of the camera by the consumer/photographer is undesirable because it increases the risk of damage to and/or contamination of the interior of the camera and its reusable components. These considerations are resolved by the particular design of the door 654 provided on the rear cover, as shown in FIG. 20, to access the film chamber 604. To facilitate recycling without damage to the camera, the door 654 may be attached to the rear cover by a living or flexible hinge integrally formed as a groove or a reduced thickness portion of the cover. An example of a living hinge in a film cassette door for a single use camera is disclosed in commonly owned U.S. Pat. No. 5,255,041, the disclosure of which is incorporated by reference herein. Alternatively, the door 654 may be connected to the rear cover by a frangible connection integrally formed therewith and designed to break away from the remainder of the rear cover. In either case, the opening of the door 654 provides access to film cassette 608 without damaging or exposing the camera parts attached to the camera body 602. Similarly, a second door 656 can also be provided on the rear cover 630 to be flexibly opened or broken away by the photofinisher to remove the flash battery 650, if desired. See FIG. 20.

The camera 600 is then turned over to the manufacturer for recycling as will now be described with reference to FIGS. 17–21. The recycling process may comprise the following steps: First, the front cover 620 and rear cover 630 may be detached from the camera body 602. It should be readily apparent that the covers 620, 630 and body 602 may utilize a number of means for attaching the structural parts together; for example, hook and/or press fitting members may be used, or the parts can be ultrasonically welded together. Thus, each cover may have a suitable number of conventional releasable hook structures (one of which is shown at 661, 662) or other attachment means for allowing removal of the covers from the body. The covers may be made from a recyclable plastic such as polystyrene and can be sent to be pulverized. The pulverized material may be blended with virgin materials and new covers or other parts molded therefrom.

The prewind spool 610, the taking lens 612, and light baffle 642 (unless integrally molded with the body 602) also are removed. The taking lens 612 also may be similarly pulverized with other lenses, blended with virgin materials, and new lenses made therefrom.

Other parts, typically more costly components designed to be reused, such as the main body 602 and the major parts supported by the body, e.g., the unibody viewfinder 618, shutter mechanism 619, film advancing and metering mechanism, and flash illumination assembly 700 may be examined carefully for wear or damage. Those parts deemed damaged or worn may be removed from the body 602 and replaced with new parts. Those remaining reusable parts, such as the viewfinder 618, shutter mechanism 619, etc., that can be reused remain supported by the camera body, for construction into a camera 600.

A new front cover 620 is then fitted to the front face of the body 602 and an unexposed roll of film 609 contained within a fresh cassette 608 is loaded into the film cartridge chamber 604. A leading potion of the film 609 contained with the cassette 608 is then engaged with the take up spool 610, housed within the body chamber 606, as is conventionally known. A new rear cover 630 is then snapped or otherwise attached onto the rear of the camera body 602 and/or to the front cover 620 by any of the attachment means discussed above.

A less rigorous but not preferred recycling process may be employed in which the covers 620, 630 are not replaced with new parts. In this case, the cameras would be inspected visually after the back cover is removed. If the camera was deemed reusable as a whole, a new film 609 then would be reloaded into the film chamber and threaded onto the take-up spool. The rear cover then would be re-attached to the camera body and/or front cover.

In either case, the film 609 may be then prewound onto the take-up spool 610, which is supported for rotation in chamber 606 so that the film is wound back into the cassette 608 as the film is being exposed. A limited torque electric screwdriver or other tool may be used to prewind the film onto the prewind spool. If a new take-up spool is not provided and if the exposed end of the prewind spool previously was deformed to prevent reuse of the spool for prewinding purposes, sufficient heat and/or pressure must be applied to rotate the spool.

At least one wind and trip check (film advance and shutter actuation) may be done to simulate taking a picture, thereby bringing the counter down to 24 (assuming a 24 exposure roll). The camera then may be inserted into a cardboard casing or a label such as 652 attached thereto by adhesive. The recycled camera then may be humidity sealed in a foil wrap, plastic bag or the like, and packaged in an outer cardboard box for sale. The recycled single use camera 600, utilizing previously used single use camera parts, such as the unibody viewfinder 618, is now fully assembled and ready for consumer use.

While the invention has been described with reference to the viewfinder's use in a single use camera, the mold, process and viewfinder of the invention can be modified for use in the production of lenses for other applications. For instance, a viewfinder in accordance with the invention can be used in any application which requires an optical sight, such as a gun sight, binoculars, reusable cameras, etc.

EXAMPLE

The following test data were compiled during the molding of optical viewfinders using the mold and methods of the invention. The molding process was conducted with a Mold Master system using polycarbonate resin.

| PROCESS MONITOR | | | | |
| --- | --- | --- | --- | --- |
| | | Historical | | |
| | Actual | Low | Ave | High |
| Cycle Time | 45.5 S | 20.1 S | 36.7 S | 57.3 S |
| Fill Time | 0.35 S | 0.25 S | 0.33 S | 0.91 S |
| Recovery Time | 1.79 S | 0.66 S | 1.67 S | 2.98 S |
| Cushion Position | 0.19 in. | 0.02 in. | 0.16 in. | 0.33 in. |
| Hydraulic Transfer | 1917 psi | 1262 psi. | 1866 psi. | 2393 psi. |
| Temperatures | | | | |
| Nozzle (540–650) | 570 DEG F. (540–650) | | Zone 1 | 570 DEG F. |
| (540–650) | | | Zone 2 | 560 DEG F. |
| (540–650) | | | | |
| Alarm Band (540–650) | 20% | | Hot Runner | 570 DEG F. |
| Feedthroat (42–250) | 130 DEG F. | | Mold Temp | 230 DEG F. |
| Timers | | | | |
| Cycle Alarm Limit | 60.0 SEC | | Cooling | 25.00 SEC |
| Inject High | 1.00 SEC .5–10 | | Extruder Delay | 5.00 SEC |
| Pack | 3.00 SEC 1–10 | | Open Dwell | 2.00 SEC |
| Hold | 2.00 SEC 1–10 | | | |

| Injection Control Data - Material Through Gate | | | | | | |
| --- | --- | --- | --- | --- | --- | --- |
| Shot Size | 0.58 IN | INJ HI PRS LMT | 2400 psi | Pack 1 | 1850 psi | 1400–2400 |
| Velocity 1 | 2.00 IN/SEC | HYD XFER PRS | 1900 psi | Pack 2 | 1800 psi | 1400–2400 |
| Velocity 2 | 2.00 IN/SEC | | | | | |
| Switchpoint 2 | 40% | | | | | |
| Velocity 3 | 2.00 IN/SEC | | | | | |
| Switchpoint 3 | 20% | CUSHION | 0.35 IN remaining | | | |
| Velocity 4 | 1.85 IN/SEC | | | | | |
| Transfer Pos | 0.23 IN | | | | | |

SET UP SHEET

Peripheral Equipment

MOLD TEMPERATURE CONTROLLERS

| | HIGH LIMIT F. DEG | SETPOINT F. DEG | LOW LIMIT F. DEG |
| --- | --- | --- | --- |
| Mold Temp #1 | 10 | 185–250 | 10 |
| Mold Temp #2 | 10 | 111–250 | 15 |
| Mold Temp #3 | 9 | 150–250 | 12 |
| Mold Temp #4 | 10 | 72–250 | 13 |
| Mold Temp #5 | 5 | 150–250 | 5 |
| Mold Temp #6 | 12 | 150–250 | 15 |
| Mold Temp #7 | 13 | 150–250 | 16 |
| Mold Temp #8 | 14 | 150–250 | 17 |

DRYERS

| | HIGH LIMIT F. DEG | SETPOINT F. DEG | LOW LIMIT F. DEG |
| --- | --- | --- | --- |
| Dryer #1 | 40 | 160–320 | 40 |
| Dryer #2 | 22 | 222 | 5 |

EXTRUDER CONTROL DATA

| Extruder Speed Init | 20% | Back Pressure Init | 50 PSI |
| --- | --- | --- | --- |
| Extruder Speed Final | 10% | Back Pressure Init | 50 PSI |

Decompress Distance 0.00 IN

The invention has been described in detail with particular reference to the preferred embodiments thereof, but it will be understood that variations and modifications can be effected within the spirit and scope of the invention.

What is claimed is:

1. A method of recycling a single use camera having a camera body including a film cassette chamber, a viewfinder formed from a support and a plurality of optically aligned lenses molded integrally with the support, a shutter mechanism, a film advance and metering mechanism, and a taking lens, all of which have been used to take pictures on an exposed roll of film since removed from the film cassette chamber and therefore are previously used single use camera parts, said method comprising the steps of:

determining that the previously used camera body having an empty film cassette chamber is suitable for recycling;

determining that the previously used viewfinder formed from a support and a plurality of optically aligned lenses integrally molded with said support is suitable for recycling with the previously used camera body; and loading an unexposed roll of film into the empty film cassette chamber of the previously used camera body.

2. The method of claim 1, wherein the camera body includes a take-up roll supported for rotation within the body, and further comprising the step of prewinding the film onto the take-up roll.

3. The method of claim 2 wherein the take-up roll is a previously used part and the step of prewinding the film onto the take-up roll comprises using a tool to apply sufficient force to rotate the roll within the body.

4. The method of claim 1, further comprising the steps of:

determining which of the previously used camera parts must be replaced with parts that have never been used before in a single use camera and therefore are new parts;

removing at least one of the previously used camera parts selected from the group consisting of the shutter mechanism, the film advance and metering mechanism, and the taking lens; and replacing salad at least one removed part with a corresponding new part.

5. The method of claim 4, further comprising the steps of:

supporting the camera body within a previously used front cover and rear cover; and attaching a paper-based material around the covers.

6. The method of claim 1, wherein the single use camera includes a front cover and a rear cover surrounding the previously used camera body and further comprising the step of removing at least one of the front and rear covers from the camera body.

7. The method of claim 6, further comprising the step of:

removing a take-up roll from the previously used camera body and replacing the take-up roll with a corresponding new part.

8. The method of claim 7, further comprising the steps of:

performing at least one wind and trip check by advancing the unexposed roll of film and activating the shutter.

9. The method of claim 8, further composing the steps of:

attaching a paper-based material around the front and rear covers; and sealing the recycled camera in a bag to preserve the unexposed roll of film loaded therein.

10. The method of claim 9, further comprising the steps of inspecting at least one of the front and rear covers to determine whether said at least one cover is suitable for reuse and reattaching said at least one cover to the camera.

11. The method of claim 10, further comprising the steps of inspecting at least one of the front and rear covers to determine whether said at least one cover is suitable for reuse and attaching at least a new cover in place of said at least one inspected cover.

* * * * *